US009060382B2

(12) United States Patent
Ridel et al.

(10) Patent No.: US 9,060,382 B2
(45) Date of Patent: Jun. 16, 2015

(54) SPLIT ARCHITECTURE REMOTE RADIO

(75) Inventors: Eran Ridel, Rosh Ha'aiyn (IL); Ran Soffer, Tel-Mond (IL)

(73) Assignee: Broadcom Corporation, Irvine, CA (US)

(*) Notice: Subject to any disclaimer, the term of this patent is extended or adjusted under 35 U.S.C. 154(b) by 307 days.

(21) Appl. No.: 13/344,016

(22) Filed: Jan. 5, 2012

(65) Prior Publication Data
US 2013/0094438 A1   Apr. 18, 2013

Related U.S. Application Data

(60) Provisional application No. 61/546,795, filed on Oct. 13, 2011.

(51) Int. Cl.
*H04W 4/00* (2009.01)
*H04W 88/08* (2009.01)

(52) U.S. Cl.
CPC .................................. *H04W 88/085* (2013.01)

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| 7,990,298 | B1 | 8/2011 | Friedmann et al. |
| 2008/0181282 | A1 | 7/2008 | Wala et al. |
| 2008/0205499 | A1 | 8/2008 | Ridel et al. |
| 2010/0085950 | A1 | 4/2010 | Sekiya et al. |
| 2010/0128676 | A1* | 5/2010 | Wu et al. ........................ 370/328 |
| 2012/0057572 | A1* | 3/2012 | Evans et al. ..................... 370/338 |
| 2012/0069880 | A1* | 3/2012 | Lemson et al. ............... 375/220 |

(Continued)

FOREIGN PATENT DOCUMENTS

| EP | 1 883 171 A2 | 1/2008 |
| TW | 201016064 A1 | 4/2010 |
| WO | WO 2011/050531 A1 | 5/2011 |

OTHER PUBLICATIONS

"Common Public Radio Interface (CPRI); Interface Specification V5.0," accessed via the Internet on Jun. 27, 2013 at http://www.cpri.info/downloads/CPRI_v_5_0_2011-09-21.pdf, Sep. 21, 2011 (119 pages).
Ericsson, "The Mini-Link TM TN R4, ETSI," accessed via the Internet on Jun. 27, 2013 at http://archive.ericsson.net/service/internet/picov/get?DocNo=I/28701-EN/LZT1105195, Dec. 31, 2010 (4 pages).

(Continued)

*Primary Examiner* — Jung-Jen Liu
(74) *Attorney, Agent, or Firm* — Sterne, Kessler, Goldstein & Fox P.L.L.C.

(57) ABSTRACT

A wireless communication system, which includes at least one base station module configured to implement a media access controller and a physical layer, and includes at least one remote radio head module configured to prepare an analog signal or a digital data signal for transmission and receipt over a link in accordance with dedicated interface specifications, and also includes at least one outdoor signal conversion module configured to perform a high rate digital-to-analog conversion and a high rate analog-to-digital conversion in accordance with the dedicated interface specifications, and further includes at least two millimeter wave antenna assemblies, where each antenna assembly is configured to transmit and receive the analog signal over a wireless link in accordance with the dedicated interface specifications.

30 Claims, 8 Drawing Sheets

(56) References Cited

U.S. PATENT DOCUMENTS

| | | | |
|---|---|---|---|
| 2012/0093084 A1* | 4/2012 | Wala et al. | 370/328 |
| 2012/0155572 A1* | 6/2012 | Kim et al. | 375/297 |
| 2012/0314797 A1* | 12/2012 | Kummetz et al. | 375/295 |
| 2013/0094438 A1* | 4/2013 | Ridel et al. | 370/328 |
| 2013/0094549 A1* | 4/2013 | Ridel et al. | 375/222 |
| 2013/0121703 A1* | 5/2013 | Kummetz et al. | 398/115 |
| 2013/0136202 A1* | 5/2013 | Kummetz et al. | 375/267 |

OTHER PUBLICATIONS

European Search Report for EP Application No. EP 12 00 7026, European Patent Office, Munich, Germany, mailed on May 13, 2013 (8 pages).

Taiwanese Office Action directed to related Taiwanese Patent Application No. 101137424, mailed Aug. 25, 2014; 10 pages.

Chinese Office Action directed towards related Chinese Application No. 201210390084.5, dated Oct. 10, 2014, from the State Intellectual Property Office of the P.R.C.; 15 pages.

* cited by examiner

SPLIT ARCHITECTURE REMOTE RADIO

CROSS REFERENCE TO RELATED APPLICATIONS

This patent application claims the benefit of U.S. Provisional Patent Application No. 61/546,795, filed Oct. 13, 2011, which is incorporated herein by reference in its entirety.

BACKGROUND OF THE INVENTION

1. Field of the Invention

The invention relates to millimeter wave point to point communications, and more specifically to a modem assembly.

2. Related Art

A radio access network (RAN) is a known component of various types of communication systems. The term "RAN" is often used to refer to an interface between a communication device and its core network (CN). Recently, several concepts have been introduced in an effort to reduce capital expenditures and operating cost associated with implementing and maintaining communication systems employing a RAN.

One such concept has been referred to as the "Cloud RAN" concept. In conventional network architecture, each antenna connects to a co-located eNodeB from which traffic is backhauled to an Evolved Packet Core (EPC) over an Internet Protocol (IP) link. Using the Cloud RAN concept, the eNodeB at the antenna is replaced with a low-cost Remote Radio Head (RRH). This allows digitized RF data to be communicated over a dedicated interface, such as, for example, common public radio interface (CPRI) to provide a centralized processing device where baseband processing can be performed.

However, due to the high bit rate requirements associated with the CPRI specification (or any other framer, proprietary or public), communication between a base station and the RRHs is carried out using a fiber optic cable. The fiber optic cable is connected directly between the base station and the RRH. Using a fiber optic cable, link speeds are sufficient to allow for control of strict timing requirements necessitated by the standards governing communication on a link, such as the CPRI standard. However, deployment of a fiber optic cable in certain areas, such as densely populated areas and areas having unusual terrain, may not be possible or would be prohibitively expensive. For example, fiber optic deployment in such areas could require digging up the ground and/or moving structures built in those areas, all of which would result in very high costs and expenses. Additionally, for these reasons as well as others, fiber optic deployment takes a relatively long time to complete. Thus, there is a need for an alternative to deploying fiber optic cable, which still meets the governing standards for communication over a fiber optic link.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 7:
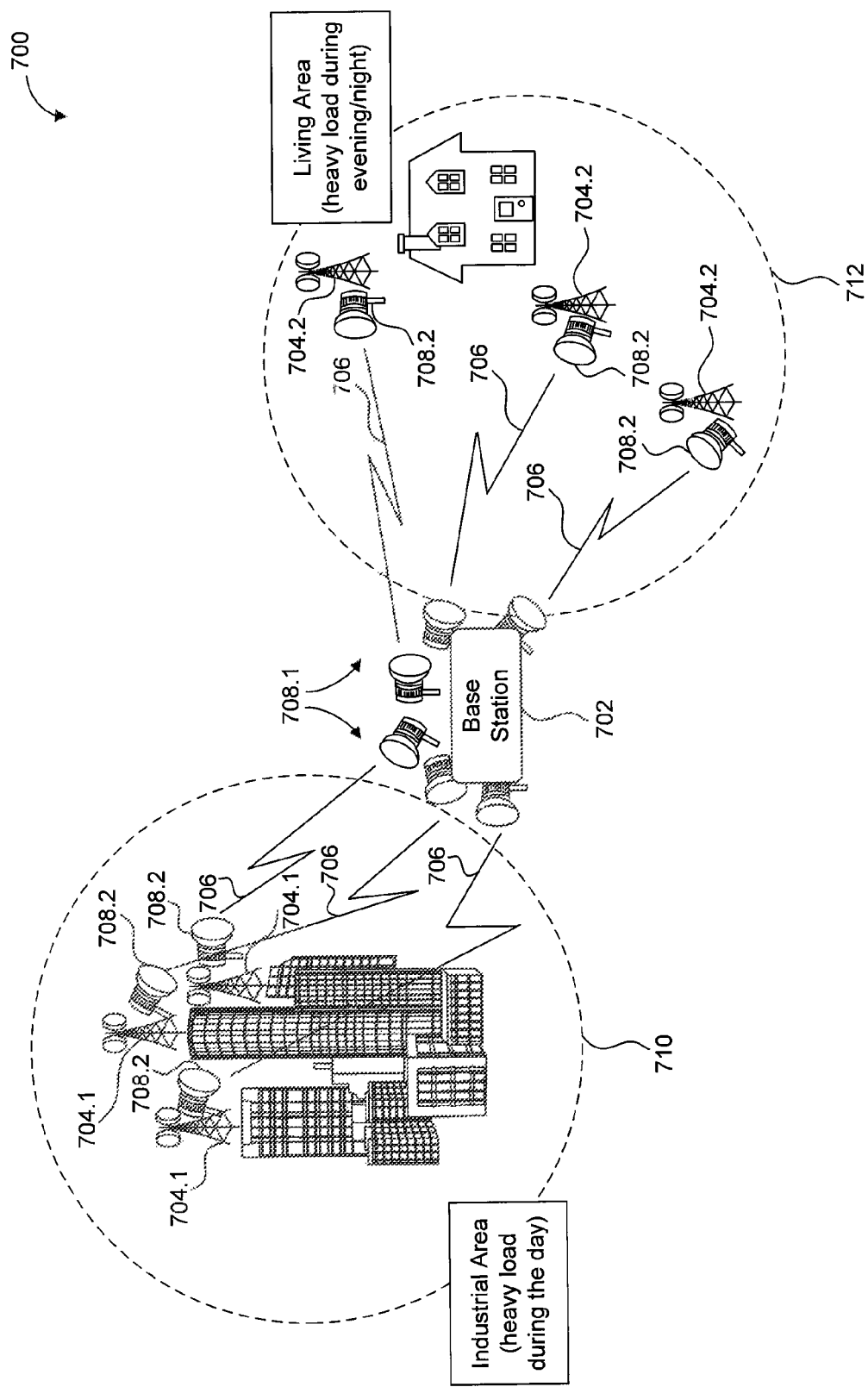
Figure 8:
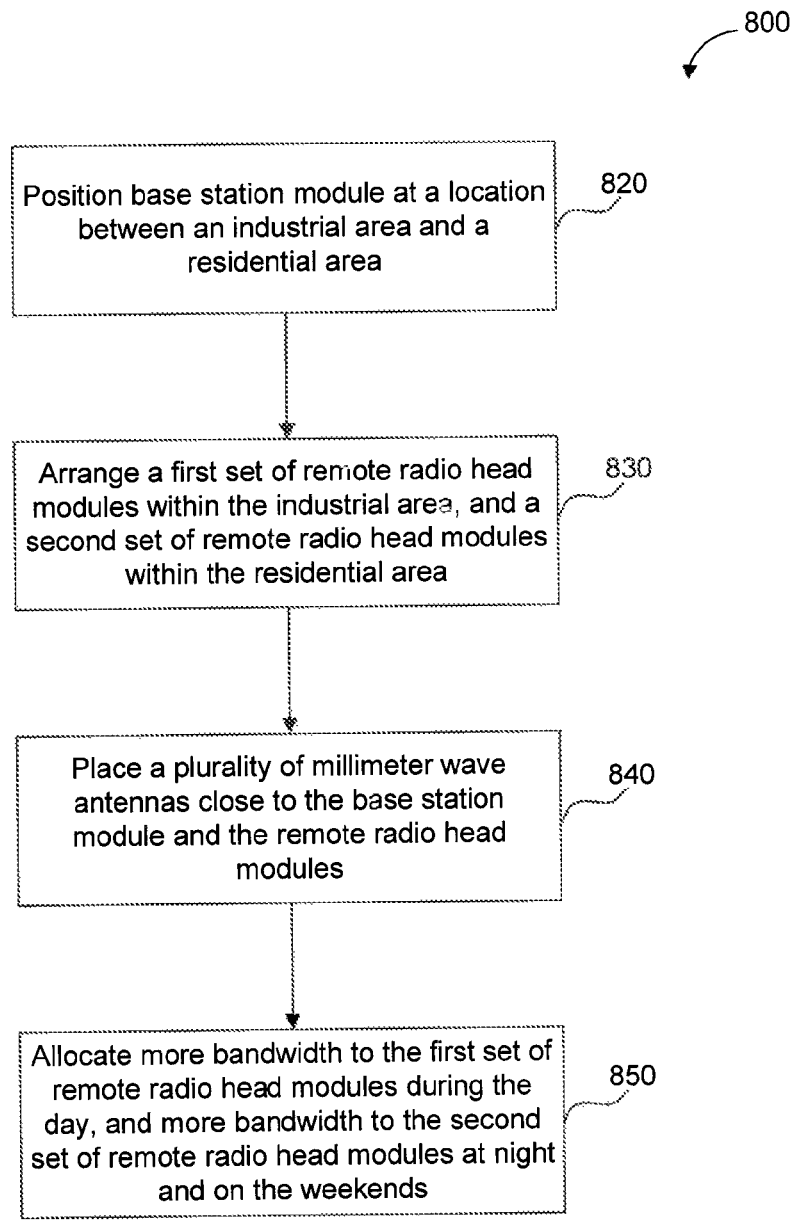

FIG. 7. is a schematic diagram of a fourth wireless communication environment, which is deployed such that a load exerted on the wireless communication environment is balanced according to an exemplary embodiment; and FIG. 8 is a flowchart of exemplary operation steps of balancing a load on a wireless communication environment according to an exemplary embodiment.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

Due to the high bit rate requirements, communication between a base station and remote radio heads (RRHs) is carried out using a fiber optic cable. The fiber optic cable is connected directly between a base station and RRHs to allow for control of strict timing requirements necessitated by standards governing communication on the link. However, deployment of a fiber optic cable in certain areas (dense population, unusual terrain, etc.) may not be possible or would be prohibitively expensive (requiring digging the ground, moving structures, etc.), thus resulting in very high expenses/cost. Additionally, deployment of the fiber optic cables may take a relatively long time. Therefore, an alternative to deploying fiber optic cable is needed.

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of wireless communication, those skilled in the relevant art(s) will recognize that the present invention may be applicable to other communications that use wired or other wireless communication methods without departing from the spirit and scope of the present invention.

An Exemplary Wireless Communication Environment

Figure 1:
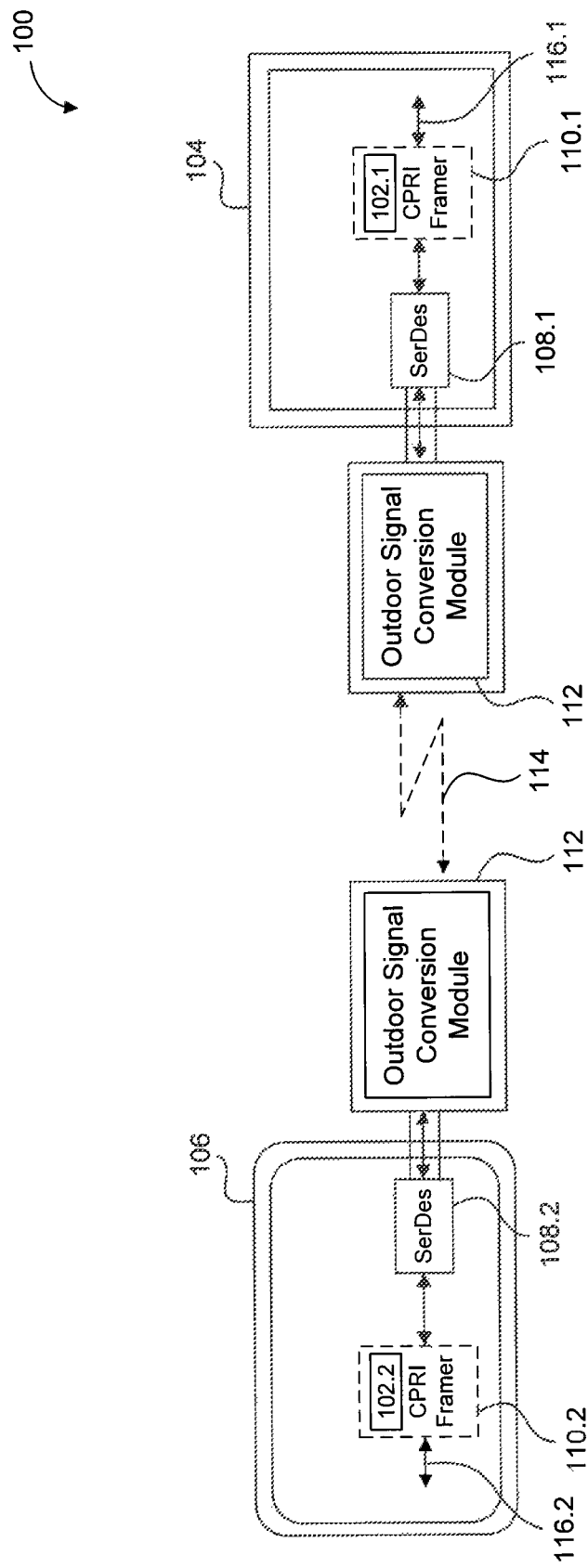
FIG. 1 is a block diagram of a wireless communication environment according to an exemplary embodiment.

FIG. 1 is a block diagram of a wireless communication environment according to an exemplary embodiment.

A wireless communication environment 100 provides for wireless communication of information, such as one or more commands and/or data, between a first wireless communication device 104 and a second wireless communication device 106. The first wireless communication device 104 may represent an exemplary embodiment of a base station module and the second wireless communication device 106 may represent an exemplary embodiment of a remote radio head (RRH) module.

The RRH module 106 may be connected to the base station module 104 over dedicated interface, such as specified by the common public radio interface (CPRI) standard or open base station architecture initiative (OBSAI) standard to provide some examples. Throughout this patent document, the CPRI specification is often referred to when discussing the standard governing communication over a link. This is for illustrative purposes only. Those skilled in the relevant art(s), will recognize that other standards, such as OBSAI, European Telecommunications Standards Institute (ETSI), open radio interface (ORI), or Federal Communications Commission (FCC), to provide some examples, may be used to govern communication over the link.

The wireless connection between the RRH module 106 and the base station module 104 requires very high bit rates, generally in the range of 0.6 gigabits per second (Gbps) to approximately 9 Gbps. The CPRI specifications were written to govern communications over fiber optic cables. However, the wireless communication environment 100 communicates over a wireless CPRI (wCPRI) link 114, in accordance with the CPRI specifications.

In the wireless communication environment 100, the base station module 104 and the RRH module 106 may each include a serial/deserializer (SerDes) module 108.1 and 108.2, respectively. Also, the base station module 104 may include a standardized framer module 110.1 coupled to the SerDes module 108.1, and the RRH module 106 may include a standardized framer module 110.2 coupled to the SerDes module 108.2. Although this patent document refers to standardized framer modules 110.1 and 110.2 when discussing the framer modules used within the communication environment 100, this is not mean to limit the disclosure in any way. Those skilled in the relevant art(s), will recognize that the standardized framer modules 110.1 and 110.2 refer to framer modules that operate according to the standards that govern communication over a link, such as CPRI to provide an example, or any other proprietary framer.

Each of the SerDes modules 108.1 and 108.2 convert digital data signals 116.1 and 116.2, respectively, between serial data and parallel interfaces in both communication directions. The framer module 110.1 frames the incoming digital data signal 116.1 with management data and synchronization information in accordance with a high-level clock signal 102.1 to form a collection of standardized digital bits according to the CPRI specifications. The high-level clock signal 102.1 is generated by the framer module 110.1, and it allows the framer module 110.1 to identify data packets within the digital data signal 116.1. Therefore, the high-level clock signal 102.1 allows the framer module 110.1 to frame the digital data signal 116.1 according to the CPRI specification. In an exemplary embodiment, the framer module 110.2 may function substantially similar to the framer module 110.1, as discussed above. Thus, the framer module 110.2 may generate a high-level clock signal 102.2 that allows the framer module 110.2 to frame the digital data signal 116.2 according to the CPRI specification.

The wireless communication environment 100 may also include a pair of outdoor signal conversion modules 112, one if which is connected to the base station module 104 and another one is connected to the RRH module 106. The outdoor signal conversion modules 112 provide wireless communication between the base station module 104 and the RRH module 106 over the wCPRI link 114 while also meeting the high bit rate requirements defined by the CPRI specifications. Therefore, neither the base station module 104 nor the RRH module 106, according to this exemplary embodiment, would be able to distinguish whether a transmission occurred over the wCPRI link 114 or over a conventional fiber optic cable.

Given this ability of the base station module 104 and RRH module 106 to communicate over the wCPRI link 114, the deployment of the RRH modules 106 is rendered quick and easy. In particular, RRH deployment in this embodiment of the present disclosure is very similar to standard point to point (PtP) link deployment. Additionally, RRH modules 106 may be deployed throughout dense urban areas without incurring substantial costs and expenses. Further, as will be discussed in greater detail later in this disclosure, the RRH modules 106 may still be deployed at significant distances when compared with the fiber optic cables. Typically, the wCPRI link 114 can support a link range of up to approximately 2.5 kilometers between the base station module 104 and the RRH module 106; however, other link ranges are possible without departing from the spirit and scope of the present disclosure.

An Exemplary Outdoor Signal Conversion Module

Figure 2:
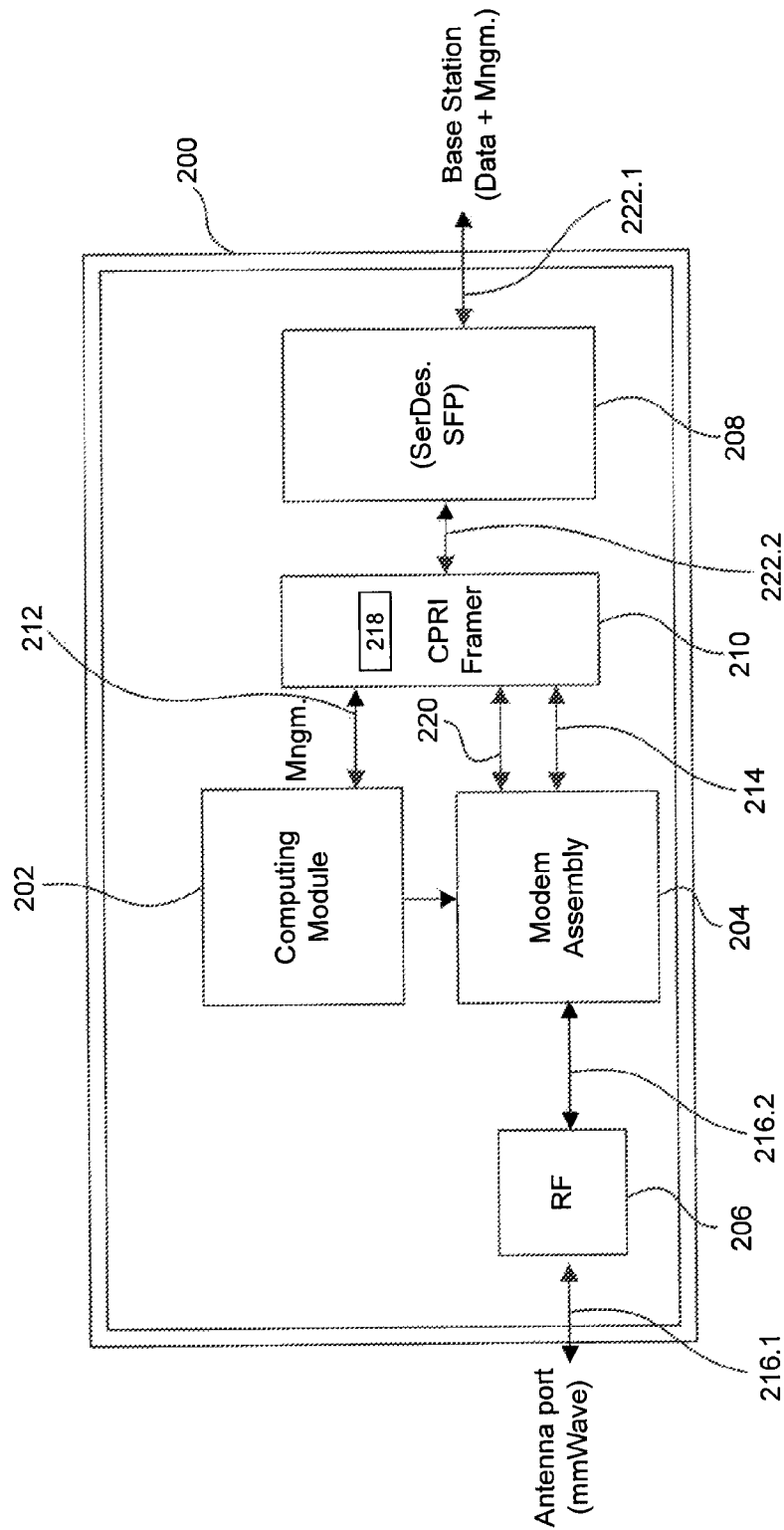
FIG. 2 is a block diagram of an outdoor signal conversion module that is implemented as part of the wireless communication environment according to an exemplary embodiment.

FIG. 2 is a block diagram of an outdoor signal conversion module that is implemented as part of the wireless communication environment according to an exemplary embodiment. An outdoor signal conversion module 200 may represent an exemplary embodiment of the outdoor signal conversion modules 112.

The outdoor signal conversion module 200 includes a computing module 202 that performs various computations on management data 212. The signal conversion module 200 also includes a modem assembly 204 coupled to the computing module 202. The modem assembly 204 may perform a digital signal processing (DSP) on a plurality of standardized digital samples 214 and then convert the standardized digital samples 214 using a high rate digital-to-analog conversion (DAC) to form an analog sequence 216.2. Alternatively, in an exemplary embodiment, the modem assembly 204 may perform a high rate analog-to-digital conversion (ADC) of the analog sequence 216.2 and then a DSP processing to form the standardized digital samples 214. Further, in an exemplary embodiment, the modem assembly 204 may perform both the high rate DSP and DAC of the standardized digital samples 214 to form the analog sequence 216.2, and the high rate ADC and DSP of the analog sequence 216.2 to form the standardized digital samples 214. The signal conversion module 200 further includes an RF functional module 206 coupled to the modem assembly 204, which performs operations upon the analog sequence 216.2. In an exemplary embodiment, the RF functional module 206 may perform either an up-conversion of the analog sequence 216.2 such that the analog signal 216.1 is suitable for transmission over the wCPRI link 114, or a down-conversion of the analog signal 216.1 such that the modem assembly 204 can perform the high rate ADC of the analog sequence 216.2.

The signal conversion module 200 may also include a serial/deserializer (SerDes) module 208 and a standardized framer module 210. The SerDes module 208 may represent an exemplary embodiment of the SerDes module 108.1, and the framer module 210 may represent an exemplary embodiment of the framer module 110.1. The SerDes module 208 converts an incoming digital data signal 222.1 between serial data and parallel interfaces in both communication directions. Additionally, the framer module 210 receives a digital data sequence 222.2 and frames the digital data sequence 222.2 with the management data 212 in accordance with a high-level clock signal 218 to form the standardized digital samples 214 according to the CPRI specifications. The high-level clock signal 218 may represent an exemplary embodiment of the high-level clock signal 102. Also, the high-level clock signal 218 is generated by the framer module 210, and it allows the framer module 210 to identify data packets within the digital data sequence 222.2. Therefore, the high-level clock signal 218 allows the framer nodule 210 to frame the digital data sequence 222.2 according the CPRI standard. Additionally, the signal conversion module 200 generates a second clock signal, a synchronous clock signal 220, which functions as an oscillator to synchronize the base station module 104 and the RRH module 106. The synchronous clock signal 220 is added by the framer module 210 prior to any operations being performed by the modem assembly 204.

In an exemplary embodiment, the synchronous clock signal 220 may be transmitted via a dedicated port (not shown in FIG. 2). The synchronous clock signal 220 may also be based on a precision time protocol (PTP), defined in the IEEE 1588-2008 (1588v2) standard, or a Synchronous Ethernet (SyncE) protocol. However, any clock/networking protocol that is capable of synchronizing a transmitter and receiver over a wireless link may be used without departing from the spirit and scope of the present disclosure. The synchronous clock signal 220 is an integral feature of the present disclosure due to the strict timing requirements defined by the CPRI standard.

The signal conversion module 200 performs a variety of functions on the incoming digital data signal 222.1 to allow the corresponding analog signal 216.1 to be transmitted and/or received over the wCPRI link 114. For illustrative purposes only, the functionality of the signal conversion module 200 will be discussed with reference to the signal conversion module's 200 preparation of the analog signal 216.1 for transmission over the wCPRI link 114. However, an analogous process can be performed such that the analog signal 216.1 can be received after its transmission over the wCRPI link 114, and converted back into the digital data signal 222.1 that conform to the CPRI standard.

Accordingly, upon receipt of the digital data signal 222.1 at the base station module 104, the base station module 104 transmits the digital data signal 222.1 to the signal conversion module 200. The digital data signal 222.1 is then input into the SerDes module 208, which converts the digital data signal 222.1 between serial data and parallel interfaces to form the digital data sequence 222.2. In an exemplary embodiment, the SerDes module 208 may also include a small form factor pluggable transceiver (SFP) such that the SerDes module 208 can receive data over a wireless link or over a fiber optic link.

The digital data sequence 222.2 is input into the framer module 210, which then frames the digital data sequence 222.2. The framer module 210 also frames the digital data sequence 222.2 with the management data 212 in accordance with a high-level clock signal 218 to form the standardized digital samples 214 according to the CPRI specifications. In an exemplary embodiment, the framer module 210 outputs the relevant management data 212 to the computing module 202, and outputs the resulting standardized digital samples 214 and additional management data 212 to the modem assembly 204.

In an exemplary embodiment, the SerDes module 208 and the framer module 210 may reside solely in the base station module 104. Therefore, in such an exemplary embodiment, the signal conversion module 200 does not include the SerDes module 208 or the framer module 210. Additionally, in such an exemplary embodiment, the computing module 202 receives the management data 212 directly from the base station module 104, and not from the framer module 210.

The computing module 202 performs various computations on the management data 212, and then performs a management task over the modem assembly 204. The functionality of the modem assembly 204 will be discussed in greater detail later in this disclosure. The analog sequence 216.2 is then input into the RF functional module 206 from the modem assembly 204. As discussed in greater detail above, the RF functional module 206 performs operations upon the analog sequence 216.2, such as up-conversion of the analog sequence 216.2, such that the analog signal 216.1 is suitable for transmission over the wCPRI link 114. The analog signal 216.1 is then sent to a millimeter wave antenna via an antenna port, which transmits the analog signal 216.1 over the wCPRI link 114.

An Exemplary Millimeter Wave Modem Assembly

Figure 3:
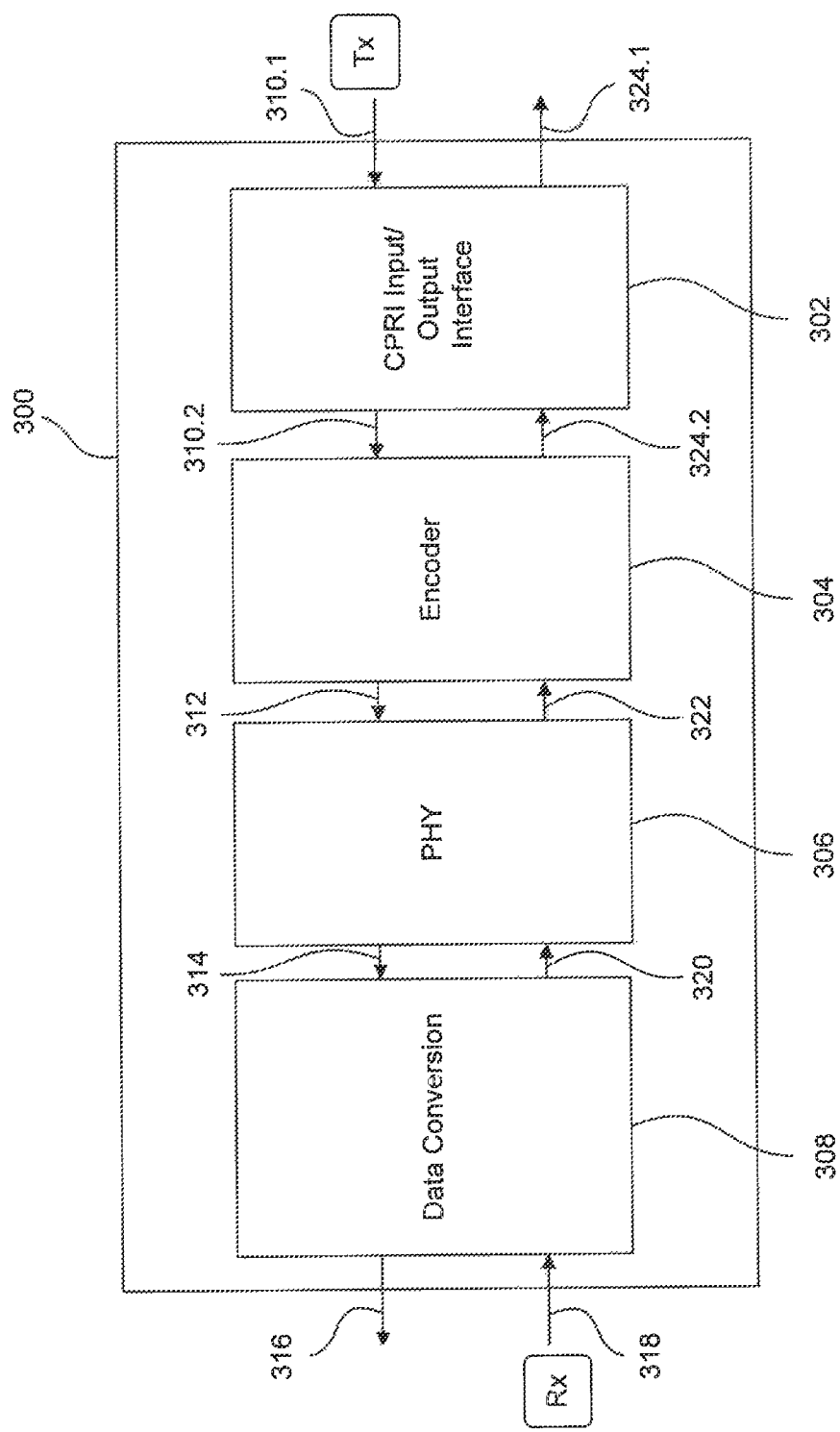
FIG. 3 is a block diagram of a millimeter wave modem assembly that is implemented as part of the outdoor signal conversion module according to an exemplary embodiment.

FIG. 3 is a block diagram of a millimeter wave modem assembly 300 that may be implemented as part of the outdoor signal conversion module 200 according to an exemplary embodiment. The millimeter wave modem assembly 300 may represent an exemplary embodiment of the modem assembly 204.

Additionally, in an exemplary embodiment, the modem assembly 300 may be a Broadcom Corporation BCM85100, which supports bit rates of up to approximately 9 Gbps. The Broadcom Corporation BCM85100 is provided for illustrative purposes only, and it is not intended to be the only modem assembly capable of being used herein, and is not meant to limit this disclosure. In particular, any modem assembly that meets the strict specifications described in this disclosure may be used. Additionally, as will become apparent to those skilled in the relevant art(s), the modem assembly 300 may operate in a continuous mode without any interruption, or it may operate over a non-continuous link, such as a Time Duplex Division (TDD), to provide an example, so long as the operations meet the CPRI specifications.

The modem assembly 300 includes an input/output (IO) interface module 302, which is configured to receive digital data streams 310.1, and transmit recovered digital data streams 310.2. The modem assembly 300 may also include an encoder module 304, which is electrically connected to the IO interface module 302. The encoder module 304 encodes the recovered digital data streams 310.2 to form coded digital bits 312. The encoder module 304 may represent an exemplary embodiment of a channel code encoder, which allows for the transmitted power to be utilized more efficiently in terms of the performance of the modem assembly 300. The encoder module 304 may also encode the coded digital bits 312 using a 8b/10b encoding scheme. In such an embodiment, the encoder module 304 encodes the coded digital bits 312 by mapping an 8-bit symbol to a 10-bit symbol. The encoder module 304 may also encode the coded digital bits 312 using a forward error correction (FEC) scheme, such as a low-density parity-check (LDPC) code to provide an example. Using a FEC scheme increases the probability that transmitted information will be successfully recovered (error free).

Additionally, the modem assembly 300 includes a physical layer (PHY) module 306 electrically connected to the encoder module 304. In an exemplary embodiment, the PHY module 306 may either convert the coded digital bits 312 into digital symbols and then into digital samples 314, or convert received digital samples 320 into received digital symbols and then into received coded digital bits 322. The PHY module 306 may also be capable of performing both of these conversions within a single module. Further, the modem assembly 300 may include a data conversion module 308, which is electrically connected to the PHY module 306. The data conversion module 308 performs a high rate DAC of the digital samples 314 to form an analog signal 316 suitable for transmission over the wCPRI link 114. In an exemplary embodiment, the data conversion module 308 may perform a high rate DAC of the digital symbols to form the analog signal 316 suitable for transmission over the wCPRI link 114, instead of performing the high rate DAC of the digital samples 314. Additionally, the modem assembly 300 allows for the transmission power to be configurable at the data conversion module 308. In particular, the transmission power can be configured according to an Adaptive Code Modulation and Buad (ACMB) specification. Thus, the transmission power is configurable to have a constant peak, constant power, or any other such characteristic.

In an exemplary embodiment, the data conversion module 308 may perform a high rate ADC of a received analog signal 318 to form received digital samples 320. However, in this particular embodiment, the encoder module 304, or a portion thereof, is replaced with a decoder module (not pictured) that is configured to decode the received coded digital bits 322 to form received digital data streams 324.2. The IO interface module then transmits received recovered digital data streams 324.1 to either a connected base station module or RRH module.

As referred to throughout this patent document, the term high rate conversion means a data conversion that takes place at such high bit rates that the converted data is capable of being transmitted across a link according to the CPRI specifications. The high rate ADC and DAC are integral to the present disclosure because the ADC and DAC performances are the limiting factors for the maximum rates and modulation that can be achieved by the modem assembly 300. Accordingly, the data conversion module 308 is capable of performing the high rate ADC and DAC at up to approximately 9 Gbps; however, other data rates are possible without departing from the spirit and scope of the present disclosure. The data conversion module 308 is also capable of performing the high rate ADC and DAC at baud rates of approximately 125 MSym/Sec to approximately 1.7 Gsym/Sec, and at a bandwidth of approximately 2 GHz; however, other baud rates and/or bandwidths are possible without departing from the spirit and scope of the present disclosure. Further, the data conversion module 308 is capable of performing the high rate ADC and DAC at a high modulation order such as 128QAM or 256QAM to provide some examples; however, other modulation orders are possible without departing from the spirit and scope of the present disclosure.

In an exemplary embodiment, the modem assembly 300 also reduces the transmission delay over the wCPRI link 114 when compared to the delay over a conventional fiber optic cable. In such an exemplary embodiment, the BCM85100's maximum latency for transmission and receipt is shown below:

Maximum allowed cable length (CPRI): 10 Km

One side delay due to maximum cable length (speed of light in fiber optic cable is 200000 Km/Sec):

$$OpticDelay=10\ Km/200000\ [Km/Sec]=50\ uSec$$

Maximum mmWave link distance at 5nines (due to physical limitation): 2.5 Km

Maximum mmWave link delay:

$$mmWaveDelay=2.5\ Km/300000\ [Km/Sec]=8.3\ uSec$$

Spare delay due to the mmWave shorter link:

$$SpareDelay=OpticDelay-mmWaveDelay=50\ uSec-8.3\ uSec=41.75\ uSec$$

Delay of other component in the AODU: AODU_SysDelay=2 uSec

BCM85100 PHY layer Maximum latency for Tx+Rx $$BRCM85100_{max\_delay\_Tx+Rx}=SpareDelay-AODU\_SysDelay=39.7\ uSec.$$

An Exemplary Deployment of a Wireless Communication Environment

Figure 4:
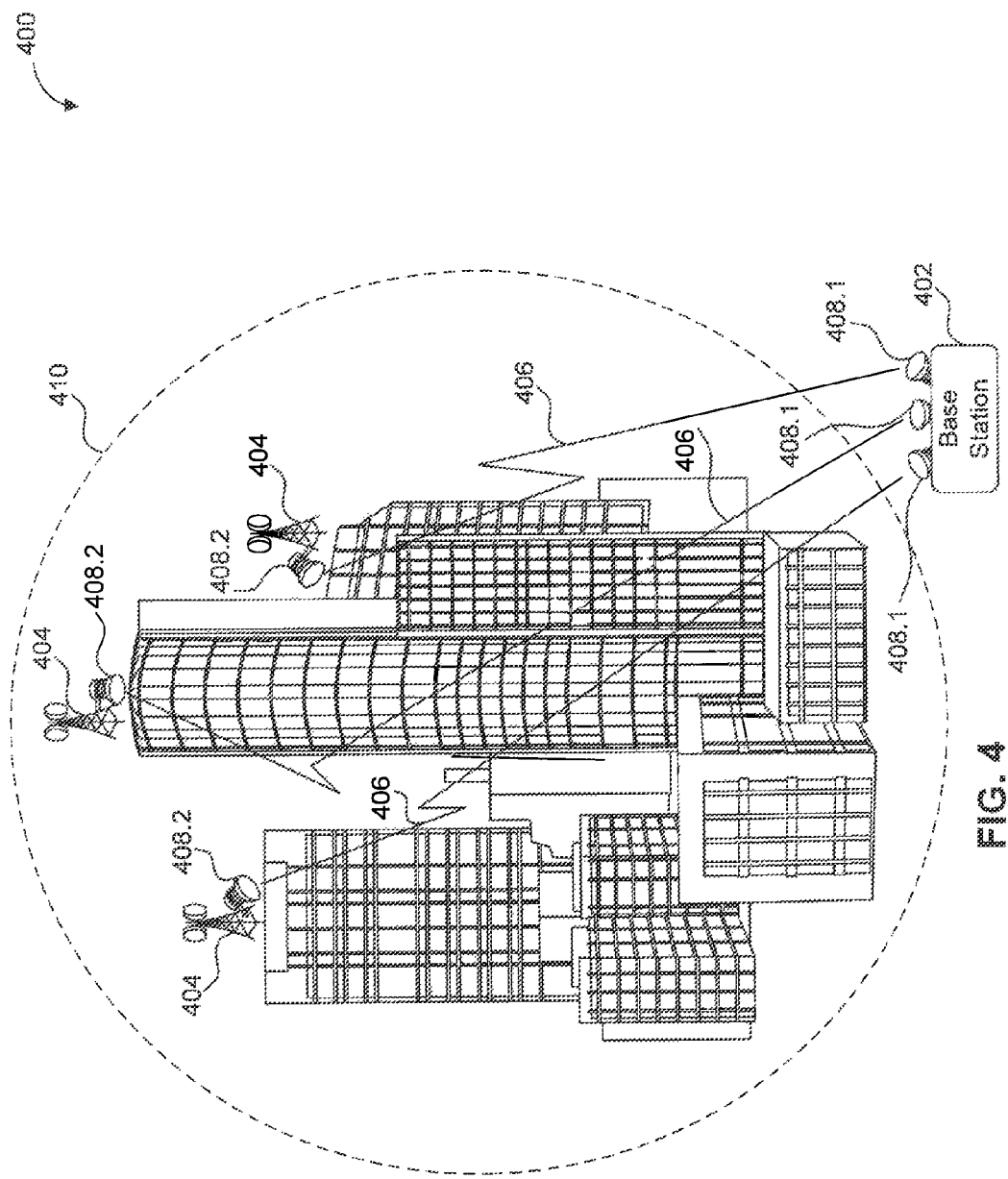
FIG. 4 is a schematic diagram of a wireless communication environment, which is deployed according to an exemplary embodiment.

FIG. 4 is a schematic diagram of a wireless communication environment, which is deployed according to an exemplary embodiment.

A wireless communication environment 400 provides for wireless communication of information, such as one or more commands and/or data, between a first wireless communication device, e.g. base station module 402 and a plurality of second wireless communication devices 404. In an embodiment, The first wireless communication device is the base station module 402. However, first wireless communications device may be another type of device. The first wireless communication device 402 may also be an embodiment of the first wireless communication device 104 (FIG. 1). Each of second wireless communication devices 404 may represent an embodiment of a RRH module, such as RRH module 106 (FIG. 1).

The plurality of RRH modules 404 may be connected to the base station module 402 over a plurality of wCPRI links 406. Although the present disclosure refers to wireless CPRI links when discussing the type of wireless links used for communication between the base station module 402 and the RRH modules 404, this is for illustrative purposes only. Those skilled in the relevant art(s) will recognize that wireless links that are governed by other standards such as OBSAI, ETSI, ORI, or FCC, to provide some examples, may be used to wirelessly connect the base station module 402 to the RRH modules 404. Also, each of the wCPRI links 406 may represent an exemplary embodiment of the wCPRI link 114.

The wireless communication environment 400 may also include multiple millimeter wave antennas 408.1 and 408.2. The millimeter wave antennas 408.1 and 408.2 are configured to transmit and receive the analog signal 216.1 over the plurality of wCPRI links 406, in accordance with the CPRI standard. In an exemplary embodiment, the wireless communication environment 400 includes one millimeter wave antenna 408.1 that is positioned substantially close to the base station module 402. The wireless communication environment 400 may also include an additional number of millimeter wave antennas 408.2 that is equal to the number of RRH modules 404 deployed in the wireless environment 400. In such an exemplary embodiment, each one of the millimeter wave antennas 408.2 is positioned substantially close to a different RRH module 404.

In an exemplary embodiment, the wireless communication environment 400 may also include multiple outdoor signal conversion modules 112 (not shown in FIG. 4). As discussed in more detail previously in this disclosure, the outdoor signal conversion modules 112 are configured to prepare the analog signal 216.1 and the digital data signal 222.1 for transmission and receipt over a link in accordance with the CPRI standard. In particular, if a signal is to be sent out via one of the millimeter wave antennas 408.1 or 408.2 to either the base station module 402 or one of the RRH modules 404, then the outdoor signal conversion module 112 will prepare the analog signal 216.1 to be transmitted and subsequently received (by a second outdoor signal conversion module 112) over one of the wCPRI links 406. If the signal is to be sent out to the base station module 402 or one of the RRH modules 404 over a fiber optic link, then the outdoor signal conversion module 112 will prepare the digital data signal 222.1 for transmission and a subsequent receipt (by a second outdoor signal conversion module 112).

Additionally, one of the outdoor signal conversion modules 112 is positioned substantially close to the base station module 402, and an additional number of the outdoor signal conversion modules 112, which is equal to the number of RRH modules 404 deployed in the wireless environment 400, are positioned substantially close to each one of the RRH modules 404.

In an exemplary embodiment, the wireless communication environment 400 may include only one outdoor signal conversion module 112 positioned either near the base station module 402 or one of the RRH modules 404. In such an exemplary embodiment, the modem assembly 204 and the RF functional module 206 may be built into either the base station module 402 or one of the RRH modules 402, whichever module does not have the outdoor signal conversion module 112 positioned near it. Further, in an exemplary embodiment, the wireless communication environment 400 may not include any outdoor signal conversion modules 112. In such an exemplary embodiment, the base station module 402 and the RRH modules 404 will each include the modem assembly 204 and the RF functional module 206. Still further, in an exemplary embodiment, the entire outdoor signal conversion module 112 may be built into both base station module 402 and the plurality of RRH modules 404.

Therefore, the base station module 402 and RRH modules 404 are capable of communicating over the plurality of wCPRI links 406, which allows the base station module 402 and the RRH modules 404 to communicate wirelessly while also meeting the high bit rate requirements defined by the CPRI specifications. Therefore, neither the base station module 402 nor the RRH modules 404 according to this exemplary embodiment would be able to distinguish whether a transmission occurred over one of the wCPRI links 406 or over a conventional fiber optic cable.

Given this ability of the base station module 402 and RRH modules 404 to communicate over the plurality of wCPRI links 406, the deployment of the RRH modules 404 in densely populated areas is rendered quick and easy. In particular, the base station module 402 may be positioned at a location substantially removed from a densely populated area 410. In an exemplary embodiment, the base station module may be located in a rural area, along a coastline, or in an unpopulated area, to provide some examples; however other locations are possible without departing from the spirit and scope of the present disclosure. Additionally, the plurality of RRH modules 404 may be deployed substantially within the densely populated area 410, such as within as large city to provide an example. In an exemplary embodiment, the RRH modules 106 may be deployed throughout the densely populated areas 410 at elevated locations, such as on top of buildings or towers, to provide some examples; however other elevated locations are possible without departing from the spirit and scope of the present disclosure.

These types of deployment, are rendered possible by the fact that the base station module 402 and the RRH modules 404 are able to communicate wirelessly while also meeting the high bit rate requirements defined by the CPRI specifications. As discussed above, since the base station module 402 and the RRH modules 404 communicate over the plurality of wCPRI links 406, fiber optic cables are not required for the base station module 402 and the RRH modules 404 to communicate according to the CPRI specifications. Therefore, the RRH modules 404 may be placed at elevations that were previously unavailable due to the physical and economical limitations associated with fiber optic links. In an exemplary embodiment, the RRH modules 404 may also be place on top of, or affixed to, artificially constructed structures within the densely populated area 410. Conventional deployment of RRH modules did not permit RRH modules to be positioned on or near such structures, because fiber optic cables usually were deployed underground. Therefore, conventional deployment required that buildings and other structures be torn-down and moved, so that the ground could be dug-up to facilitate the laying of the fiber optic cable. More than that, a PtP fiber optic cable is required to connect the base station module 402 to the RRH module 404 due to the strict timing requirements. The cable cannot path through routers or any other communication center.

Further, the plurality of wCPRI links 406 permits deployment of the base station module 402 and the RRH modules 106 at greater distances then were previously possible with the fiber optic cables. Typically, the wCPRI links 406 can support a link range of up to approximately 2.5 kilometers between the base station module 402 and the RRH modules 404; however, other link ranges are possible without departing from the spirit and scope of the present disclosure.

Also, in an exemplary embodiment, placing the base station module 402 at a location substantially removed from the densely populated area 410, and placing the RRH modules 404 at locations substantially within the densely populated area 410 allows for different sized millimeter wave antennas 408.1 and 408.2 to be utilized. In such an embodiment, the millimeter wave antennas 408.2 positioned substantially close to the RRH modules 404 may be smaller in diameter then the millimeter wave antenna 408.1 that is positioned substantially close to the base station module 402. In particular, the millimeter wave antennas 408.2 positioned substantially close to the RRH modules 404 may each have a diameter in the range of approximately 20 centimeters (cm) to approximately 60 centimeters (cm). The millimeter wave antenna 408.1 that is positioned substantially close to the base station module 402 may have a diameter of approximately 60 cm. In such an exemplary embodiment, having smaller millimeter wave antennas 408.2 at the locations within the densely populated area 410 allows for a more efficient deployment of the wireless communication environment 400 because each millimeter wave antenna 408.2 consumes less space at each of the deployment locations, which is increasingly important in densely populated areas 410 where space may be limited.

An Exemplary Deployment of a Wireless Communication Environment

Figure 5:
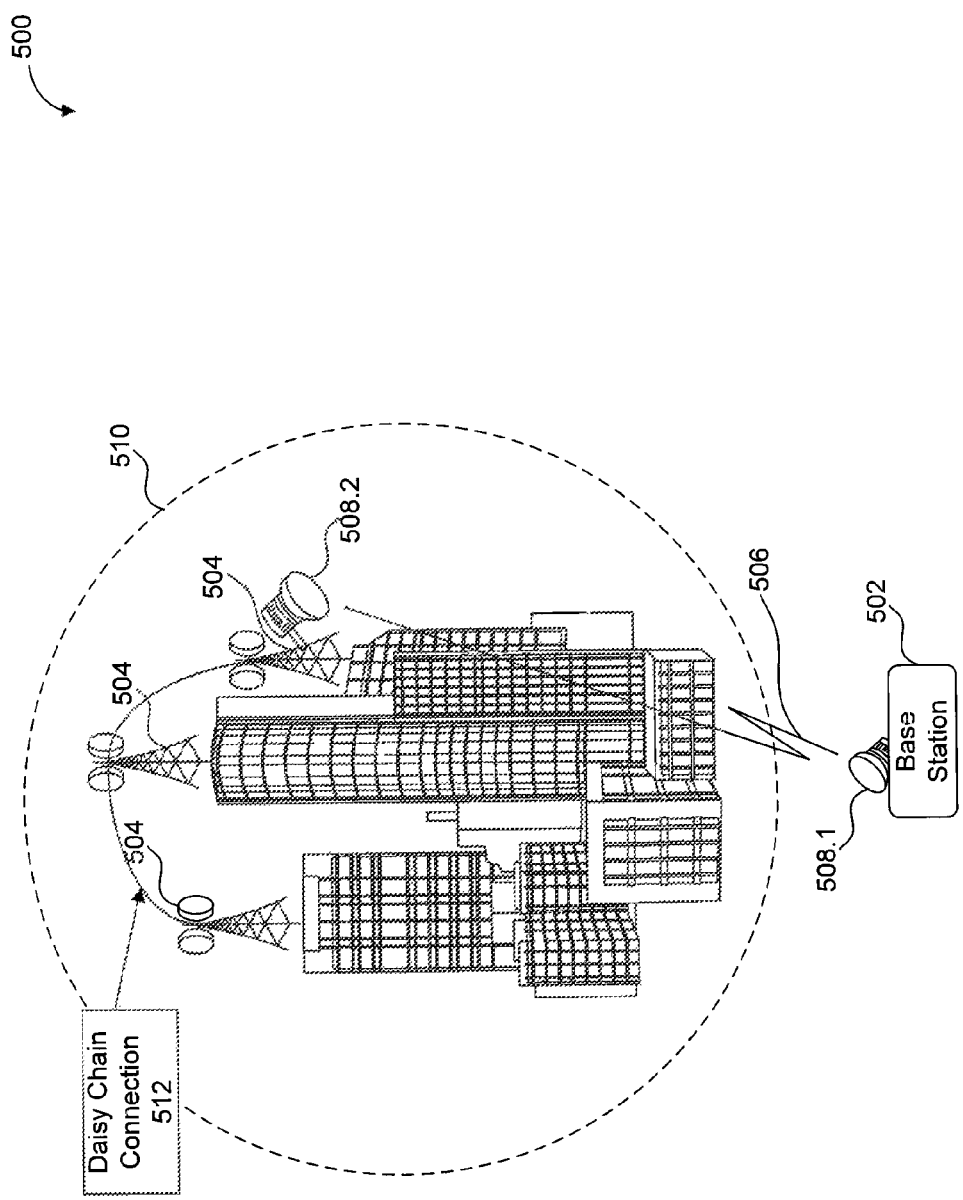
FIG. 5 is a schematic diagram of a second wireless communication environment, which is deployed according to an exemplary embodiment.

FIG. 5 is a schematic diagram of a second wireless communication environment, which is deployed according to an exemplary embodiment.

A wireless communication environment 500 provides for wireless communication of information, such as one or more commands and/or data, between a first wireless communication device, e.g. base station module 502 and a plurality of second wireless communication devices 504. In an embodiment, the first wireless communication device is the base station module 502. However, the first wireless communication device may be another type of device. The first wireless communication device 502 may also be an embodiment of the first wireless communication device 402 (FIG. 4). Each of the second wireless communication devices 504 may represent an embodiment of a RRH module, such as RRH module 106 (FIG. 1).

The plurality of RRH modules 504 may be connected to the base station module 502 over a wCPRI link 506, which may represent an exemplary embodiment of one of the plurality of wCPRI links 406.

The wireless communication environment 500 may also include two millimeter wave antennas 508.1 and 508.2. The millimeter wave antennas 508.1 and 508.2 may represent an exemplary embodiment of the millimeter wave antennas 408.1 and 408.2, respectively. In particular, the millimeter wave antennas 508.1 and 508.2 are configured to transmit and receive the analog signal 216.1 over the wCPRI link 506, in accordance with the CPRI standard. In an exemplary embodiment, one of the millimeter wave antennas 508.1 is positioned substantially close to the base station module 502, and the other millimeter wave antenna 508.2 is positioned substantially close to one of the plurality of RRH modules 504.

In an exemplary embodiment, the wireless communication environment 500 may include an outdoor signal conversion module 112 (not pictured in FIG. 5) positioned substantially close to the base station module 502, and an additional number of outdoor signal conversion modules 112 equal to the number of RRH modules 504 deployed in the wireless communication environment 500. In such an exemplary embodiment, each one of the additional outdoor signal conversion modules 112 is positioned substantially close to a different RRH module 504.

The base station module 502 and RRH modules 504 communicate over the wCPRI link 506, which allows the base station module 502 and the RRH modules 504 to communicate wirelessly while also meeting the high bit rate requirements defined by the CPRI specifications. Therefore, neither the base station module 502 nor the RRH modules 504 according to this exemplary embodiment would be able to distinguish whether a transmission occurred over the wCPRI link 506 or over a conventional fiber optic cable.

Therefore, in an exemplary embodiment, the base station module 502 may be positioned at a location substantially removed from a densely populated area 510, and the plurality of RRH modules 504 may be deployed substantially within the densely populated area 510. Each of the RRH modules 504 may be electrically connected to each other via a fiber optic daisy chain link 512. Therefore, only one of the RRH modules 504 receives the analog signal 216.1 via the millimeter wave antenna 508.2. Each of the remaining RRH modules 504 receive digital data signal 116.2, which is a digital conversion of the analog signal 216.1, over the fiber optic daisy chain link 512.

Figure 6:
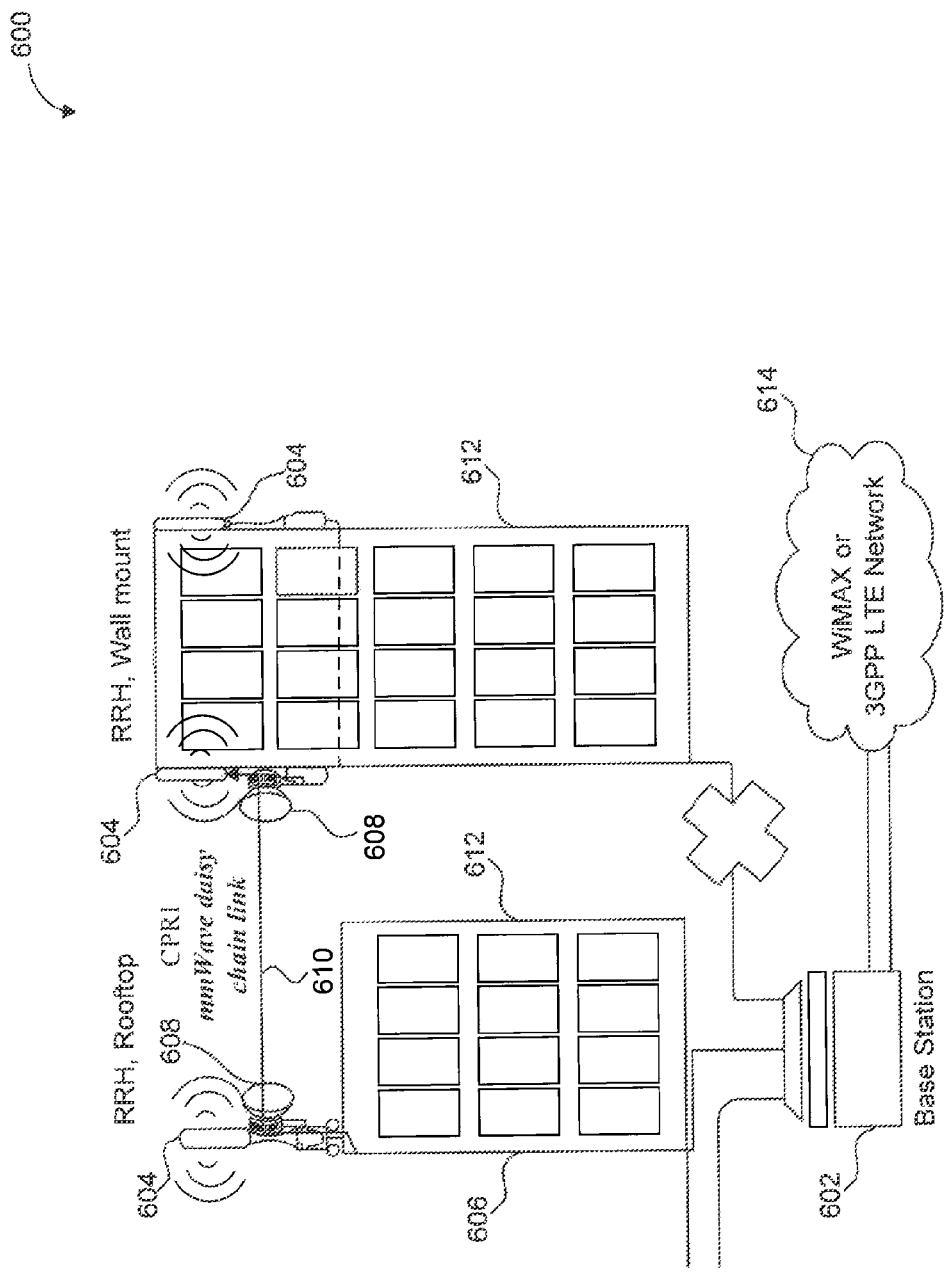
FIG. 6 is a schematic diagram of a third wireless communication environment according to an exemplary embodiment.

Referring also to FIG. 6, a schematic diagram of a third wireless communication environment is illustrated according to an exemplary embodiment.

A wireless communication environment 600 provides for wireless communication of information, such as one or more commands and/or data, between a first wireless communication device, e.g. base station module 602 and a plurality of second wireless communication devices 604. In an embodiment, the first wireless communication device is the base station module 602. However, the first wireless communication device may be another type of device. The first wireless communication device 602 may also be an embodiment of the first wireless communication device 502 (FIG. 5). Each of the second wireless communication devices 604 may represent an embodiment of a RRH module, such as RRH module 106 (FIG. 1).

One of the plurality of RRH modules 604 may be connected to the base station module 602 over a fiber optic daisy chain link 606. Also, the wireless communication environment 600 may also include a plurality of millimeter wave antennas 608. Each of the millimeter wave antennas 608 may represent an exemplary embodiment of one of the millimeter wave antennas 408. In particular, the millimeter wave antennas 608 are configured to transmit and receive the analog signal 216.1 over a millimeter wave daisy chain link 610, in accordance with the CPRI standard. In an exemplary embodiment, each of the millimeter wave antennas 608 is positioned substantially close to a different one of the plurality of RRH modules 604. Additionally, the base station module 602 may be electrically connected to a core network 614.

In an exemplary embodiment, the wireless communication environment 600 may include a plurality of outdoor signal conversion modules 112 (not pictured in FIG. 6), each being positioned substantially close to a different one of the plurality of RRH modules 604. In such an exemplary embodiment, an outdoor signal conversion module 112 is not needed at the base station module 602 because the base station module 602 transmits the digital data signal 116.2 over the fiber optic daisy chain link 606 without the need to convert the digital data signal 116.2 into the analog domain.

Each of the RRH modules 604 may communicate with one another over the millimeter wave daisy chain link 610, which allows the RRH modules 604 to communicate wirelessly with each other while also meeting the high bit rate requirements defined by the CPRI specifications. Therefore, none of the RRH modules 604 according to this exemplary embodiment would be able to distinguish whether a transmission occurred over the millimeter wave daisy chain link 610 or over a conventional fiber optic cable.

Therefore, in an exemplary embodiment, the base station module 602 may be positioned at a location substantially near a ground floor, and the plurality of RRH modules 604 may be place on top of, or affixed to, artificially constructed structures 612. Each of the RRH modules 604 may be electrically connected to each other via the millimeter wave daisy chain link 610, while only one of the RRH modules 604 receives the digital data signal 116.2 from the base station module 602 via the fiber optic daisy chain link 606. Therefore, each of the remaining RRH modules 604 receive the analog signal 216.1, which is an analog conversion of the digital data signal 116.2, over the fiber optic daisy chain link 606. Additionally, in such an embodiment, maintenance of the base station module 602 is easier because there is no longer a need to climb to the top of the artificially constructed structures 612 to work on the base station module 602.

An Exemplary Deployment of a Wireless Communication Environment

FIG. 7. is a schematic diagram of a fourth wireless communication environment, which is deployed such that a load exerted on the wireless communication environment is balanced according to an exemplary embodiment.

A wireless communication environment 700 provides for wireless communication of information, such as one or more commands and/or data, between a first wireless communication device, e.g. base station module 702 and a plurality of second wireless communication devices 704. In an embodiment, the first wireless communication device is the base station module 702. However, the first wireless communication device may be another type of device. The first wireless communication device 702 may also be an embodiment of the first wireless communication device 402 (FIG. 4). Also, each of the second wireless communication devices 704 may represent an embodiment of a RRH module, such as RRH module 406 (FIG. 4).

The plurality of RRH modules 704 may be connected to the base station module 702 over a plurality of wCPRI links 706, which may represent an exemplary embodiment of the plurality of wCPRI links 406.

The wireless communication environment 700 may also include a plurality of millimeter wave antennas 708.1 and 708.2. Each of the plurality of millimeter wave antennas 708.1 and 708.2 may represent an exemplary embodiment of one of the millimeter wave antennas 408.1 and 408.2, respectively. In an exemplary embodiment, several of the millimeter wave antennas 708.1 are positioned substantially close to the base station module 702, and each of the remaining millimeter wave antennas 708.2 are positioned substantially close to each of the plurality of RRH modules 704.

In an exemplary embodiment, the wireless communication environment 700 may include a plurality of outdoor signal conversion modules 112 (not pictured in FIG. 7), at least one being positioned substantially close to the base station module 702 and each of the others being positioned substantially close to each of the plurality of RRH modules 704.

The base station module 702 and RRH modules 704 communicate over the wCPRI links 706, which allows the base station module 702 and the RRH modules 704 to communicate wirelessly while also meeting the high bit rate requirements defined by the CPRI specifications. Therefore, neither the base station module 702 nor the RRH modules 704 according to this exemplary embodiment would be able to distinguish whether a transmission occurred over the wCPRI links 706 or over a conventional fiber optic cable.

Therefore, in an exemplary embodiment, the base station module 702 may be deployed at a location substantially between an industrial area 710 and a residential area 712. The plurality of RRH modules 704 may be divided into a first set of RRH modules 704.1 and a second set of RRH modules 704.2. The first set of RRH modules 704.1 may be deployed at locations substantially within the industrial area 710, and the second set of the RRH modules may be deployed substantially within the residential area 712. In such an exemplary embodiment, the single base station module 702 can support a whole entire city. Additionally, given this deployment strategy, the wireless communication environment 700 can efficiently balance a load exerted on the environment 700 by allocating more bandwidth to the industrial area 710 during the day, and allocation more bandwidth to the residential area 712 during the night and on weekends.

An Exemplary Method of Balancing a Load on A Wireless Communication Environment

FIG. 8 is a flowchart of exemplary operation steps of balancing a load on a wireless communication environment according to an exemplary embodiment. The disclosure is not limited to this operational description. Rather, it will be apparent to persons skilled in the relevant art(s) from the teachings herein that other operational control flows are within the scope and spirit of the present disclosure. The following discussion describes the steps in FIG. 8.

A method 800 begins at step 820, where the base station module 702 is deployed at a location substantially between the industrial area 710 and the residential area 712. The method then proceeds to step 830. In step 830, the first set of RRH modules 704.1 are deployed at locations substantially within the industrial area 710, and the second set of the RRH modules are deployed substantially within the residential area 712. The method then proceeds to step 840. In step 840, several of the millimeter wave antennas 708.1 are positioned substantially close to the base station module 702, and each of the remaining millimeter wave antennas 708.2 are positioned substantially close to each of the plurality of RRH modules 704. The method then proceeds to step 850. In step 850, a load exerted on the wireless communication environment 700 is continuously balanced. In an exemplary embodiment, the load exerted on the wireless communication environment 700 is balanced by allocating a larger amount of bandwidth to the industrial area 710 during the day, and allocation a larger amount of bandwidth to the residential area 712 during the night and on weekends. In such an exemplary embodiment, the single base station module 702 can provide a sufficient amount of wireless connectivity, which still meets the CPRI specifications, in order to support a whole entire city.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A wireless communication system, comprising:
   a base station configured to communicate with a remote radio head over a wireless link, in accordance with common public radio interface (CPRI) specifications;
   at least one outdoor signal conversion module configured to perform a high rate digital-to-analog conversion of a digital data signal to form an analog signal suitable for transmission over the wireless link in accordance with the CPRI specifications, and perform a high rate analog-to-digital conversion of the analog signal, in accordance with the CPRI specifications, to form a recovered digital data signal;
   a millimeter wave antenna assembly configured to facilitate communication of the analog signal over the wireless link in accordance with the CPRI specifications;
   a serial/deserializer module configured to convert the digital data signal between serial data and parallel interfaces in varying directions to produce a digital data stream; and
   a standardized framer module configured to receive the digital data stream and to frame the digital data stream with management data in accordance with a high-level clock signal, to form a plurality of standardized digital bits in accordance with the CPRI specifications.

2. The wireless communication system of claim 1, wherein the outdoor signal conversion module includes:
   a computing module configured to operate on the management data;
   a modem assembly configured to perform the high rate digital-to-analog conversion and the high rate analog-to-digital conversion; and
   an RF functional module configured to up-convert an analog sequence to form the analog signal that is suitable for transmission over the wireless link, and down-convert the analog signal received over the wireless link, to form the analog sequence such that the modem assembly can perform the high rate analog-to-digital conversion of the analog sequence.

3. The wireless communication system of claim 2, wherein the modem assembly is configured to perform the high rate digital-to-analog conversion and high rate analog-to-digital conversion at up to approximately 9 gigabits per second, at baud rates of approximately 125MSym/Sec to approximately 2Gsym/Sec, at a bandwidth of approximately 1 GHz, and at a high modulation order.

4. The wireless communication system of claim 2, wherein the plurality of standardized digital bits includes data that has been framed according to the CPRI specifications or open base station architecture initiative (OBSAI) specifications.

5. The wireless communication system of claim 1, wherein the outdoor signal conversion module is configured to perform the high rate digital-to-analog conversion and the high rate analog-to-digital conversion in accordance with open base station architecture initiative (OBSAI) specifications, or European Telecommunications Standards Initiative (ETSI) specifications, and wherein the millimeter wave antenna assembly is configured to transmit and receive the analog signal over the wireless link in accordance with the OBSAI specifications, or the ETSI specifications.

6. The wireless communication system of claim 2, wherein the base station module is a remote radio head module configured prepare the analog signal and the digital data signal for transmission and receipt over the link in accordance with the CPRI specifications.

7. A wireless communication system, comprising:
   a base station;
   a remote radio head configured to communicate with the base station over a wireless link, in accordance with common public radio interface (CPRI) specifications;
   an outdoor signal conversion module configured to perform a high rate digital-to-analog conversion of a digital data signal and a high rate analog-to-digital conversion of a first analog signal, in accordance with the CPRI specifications;
   at least two millimeter wave antenna assemblies, the at least two antenna assemblies configured to facilitate communication of the first analog signal between the base station and the remote radio head, over the wireless link, in accordance with the CPRI specifications;
   a serial/deserializer module configured to convert the digital data signal between serial data and parallel interfaces in varying directions to produce a digital data stream; and
   a standardized framer module configured to receive the digital data stream and to frame the digital data stream with management data in accordance with a high-level clock signal, to form a plurality of standardized digital hits in accordance with the CPRI specifications.

8. The wireless communication system of claim 7, wherein the outdoor signal conversion module includes:
   a computing module configured to operate on the management data;
   a modem assembly configured to perform the high rate digital-to-analog conversion to form a first analog sequence, which is suitable for transmission over the wireless link in accordance with the CPRI specifications, and perform the high rate analog-to-digital conversion in accordance with the CPRI specifications to form a recovered digital data signal; and
   an RF functional module configured to up-convert the analog sequence to form the first analog signal that is suitable for transmission over the wireless link, and down-convert a second analog signal received over the wireless link, to form a second analog sequence such that the modem assembly can perform the high rate analog-to-digital conversion of the second analog sequence.

9. The wireless communication system of claim 8, wherein the modem assembly is configured to perform the high rate digital-to-analog conversion and high rate analog-to-digital conversion at up to approximately 9 gigabits per second, at baud rates of approximately 125MSym/Sec to approximately 2Gsym/Sec, at a bandwidth of approximately 1 GHz, and at a high modulation order.

10. The wireless communication system of claim 9,
wherein the outdoor signal conversion module is positioned either substantially close to or within the base station, and
wherein one of the at least two millimeter wave antenna assemblies is positioned substantially close to the base station and another one of the at least two millimeter wave antenna assemblies is positioned substantially close to the remote radio head.

11. The wireless communication system of claim 9, wherein the base station and the remote radio head are separated by a distance of up to approximately 2.5 kilometers.

12. The wireless communication system of claim 11, wherein the base station is positioned at a location substantially removed from any densely populated area, and the remote radio head is positioned substantially within the densely populated area.

13. The wireless communication system of claim 10, wherein the millimeter wave antenna assembly that is positioned substantially close to the base station is up to approximately 60 cm in size, and the millimeter wave antenna assembly that is positioned substantially close to the remote radio head has a size that is smaller than the millimeter wave antenna assembly that is positioned substantially close to the base station, and is in the range of approximately 20 cm to approximately 60 cm.

14. The wireless communication system of claim 9, wherein the base station is electrically connected to a core network.

15. The wireless communication system of claim 14, wherein the remote radio head is electrically connected to a second radio head via a millimeter wave daisy chain link or a fiber optic daisy chain link.

16. The wireless communication system of claim 7,
wherein the remote radio head is configure to prepare the first and second analog signals for communication over the wireless link in accordance with open base station architecture initiative (OBSAI) specifications, or European Telecommunications Standards Initiative (ETSI) specifications,
wherein the outdoor signal conversion module is configured to perform the high rate digital-to-analog conversion and high rate analog-to-digital conversion in accordance with the OBSAI specifications, or the ETSI specifications, and
wherein the at least two millimeter wave antenna assemblies are configured to transmit and receive the first and second analog signals over the wireless link in accordance with the OBSAI specifications, or the ETSI specifications.

17. A method of balancing a load on a wireless communication network, comprising:
positioning a base station at a location substantially between an industrial area and a residential area, wherein the base station is configured to prepare an analog signal for transmission over a wireless link in accordance with common public radio interface (CPRI) specifications;
arranging a first set of remote radio heads within the industrial area, and a second set of remote radio heads within the residential area. wherein the first and second sets of remote radio heads are configured to receive the analog signal from the base station over the wireless link in accordance with the CPRI specifications;
placing a plurality of millimeter wave antennas substantially close to the base station and the remote radio heads;
allocating a larger amount of bandwidth to the first set of remote radio heads during the a daytime period, and a larger amount of bandwidth to the second set of remote radio beads during a nighttime period and on weekends; and
positioning a first outdoor signal conversion module having a modem assembly substantially close to or within the base station, and positioning a second outdoor signal conversion module including the modem assembly substantially close to or within each of the remote radio heads in the first and second sets of remote radio heads.

18. The method of claim 17,
wherein the modem assembly is configured to perform a high rate digital-to-analog conversion and a high rate analog-to-digital conversion at up to approximately 9 gigabits per second, at baud rates of approximately 125MSym/Sec to approximately 2Gsym/Sec, at a bandwidth of approximately 1 GHz, and at a high modulation order, and
wherein the base station is configured to prepare the analog signal for transmission over the wireless link in accordance with open base station architecture initiative (OBSAI) specifications, or European Telecommunications Standards Initiative (ETSI) specifications, and
wherein the first and second sets of remote radio heads are configured prepare the analog signal for communication over the link in accordance with the OBSAI specifications, or the ETSI specifications.

19. The wireless communication system of claim 7, wherein the outdoor signal conversion module is further configured to generate a synchronous clock signal, and to synchronize the base station with the remote radio head.

20. The wireless communication system of claim 7, wherein the outdoor signal conversion module comprises a form factor pluggable transceiver.

21. The wireless communication system of claim 20, wherein the remote radio head is further configured to communicate with the base station over a fiber optic link using the form factor pluggable transceiver.

22. A wireless communication system, comprising:
a base station:
a remote radio head configured to communicate with the base station over a wireless link, in accordance with common public radio interface (CPRI) specifications;
an outdoor signal conversion module configured to perform a high rate digital-to-analog conversion and a high rate analog-to-digital conversion, in accordance with the CPRI specifications, wherein the outdoor signal conversion module includes:
a computing module configured to operate on management data;
a modem assembly configured to perform the high rate digital-to-analog conversion to form a first analog sequence, which is suitable for transmission over the wireless link in accordance with the CPRI specifications, and perform the high rate analog-to-digital conversion in accordance with the CPRI specifications to form a recovered digital data signal; and
an RF functional module configured to up-convert the analog sequence to form a first analog signal that is suitable for transmission over the wireless link, and down-convert a second analog signal received over the wireless link, to form a second analog sequence such that the modem assembly can perform the high rate analog-to-digital conversion of the second analog sequence; and at least two millimeter wave antenna assemblies, the at least two antenna assemblies configured to facilitate communication of the first and second analog signals between the base station and the remote radio head, over the wireless link, in accordance with the CPRI specifications.

23. The wireless communication system of claim 22, wherein the modem assembly is configured to perform the high rate digital-to-analog conversion and high rate analog-to-digital conversion at up to approximately 9 gigabits per second. at baud rates of approximately 125MSym/Sec to approximately 2Gsym/Sec, at a bandwidth of approximately 1 GHz, and at a high modulation order.

24. The wireless communication system of claim 23, wherein the outdoor signal conversion module is positioned either substantially close to or within the base station, and wherein one of the at least two millimeter wave antenna assemblies is positioned substantially close to the base station and another one of the at least two millimeter wave antenna assemblies is positioned substantially close to the remote radio head.

25. The wireless communication system of claim 23, wherein the base station and the remote radio head are separated by a distance of up to approximately 2.5 kilometers.

26. The wireless communication system of claim 25, wherein the base station is positioned at a location substantially removed from any densely populated area, and the remote radio head is positioned substantially within the densely populated area.

27. The wireless communication system of claim 24, wherein the millimeter wave antenna assembly that is positioned substantially close to the base station is up to approximately 60 cm in size, and the millimeter wave antenna that is positioned substantially close to the remote radio head has a size that is smaller than the millimeter wave antenna that is positioned substantially close to the base station, and is in the range of approximately 20 cm to approximately 60 cm.

28. The wireless communication system of claim 23, wherein the base station is electrically connected to a core network.

29. The wireless communication system of claim 28, wherein the remote radio head is electrically connected to a second radio head via a millimeter wave daisy chain link or a fiber optic daisy chain link.

30. The wireless communication system of claim 22,
wherein the remote radio head is configure to prepare the analog signal for communication over the wireless link in accordance with open base station architecture initiative (OBSAI) specifications, or European Telecommunications Standards Initiative (ETSI) specifications,
wherein the outdoor signal conversion module is configured to perform the high rate digital-to-analog conversion and high rate analog-to-digital conversion in accordance with the OBSAI specifications, or the ETSI specifications, and
wherein the at least two millimeter wave antenna assemblies are configured to transmit and receive the first and second analog signals over the wireless link in accordance with the OBSAI specifications, or the ETSI specifications.

* * * * *

UNITED STATES PATENT AND TRADEMARK OFFICE
CERTIFICATE OF CORRECTION

| | | |
|---|---|---|
| PATENT NO. | : 9,060,382 B2 | Page 1 of 1 |
| APPLICATION NO. | : 13/344016 | |
| DATED | : June 16, 2015 | |
| INVENTOR(S) | : Ridel et al. | |

It is certified that error appears in the above-identified patent and that said Letters Patent is hereby corrected as shown below:

In the Specification
In column 16, lines 14-15, please replace "configured prepare" with --configured to prepare--.
In column 17, line 61, please replace "area. wherein" with --area, wherein--.
In column 18, line 2, please replace "during the a daytime period" with --during a daytime period--.
In column 18, line 27, please replace "configured prepare" with --configured to prepare--.
In column 19, line 11, please replace "second. at" with --second, at--.
In column 20, line 15, please replace "configure to" with --configured to--.

Signed and Sealed this
Twenty-seventh Day of October, 2015

Michelle K. Lee
*Director of the United States Patent and Trademark Office*